(12) United States Patent
Higashi et al.

(10) Patent No.: US 7,840,853 B2
(45) Date of Patent: Nov. 23, 2010

(54) CPU SUPPRESSION SYSTEM AND CPU SUPPRESSION METHOD USING SERVICE PROCESSOR

(75) Inventors: Hidenori Higashi, Kawasaki (JP); Akihiro Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 11/857,008

(22) Filed: Sep. 18, 2007

(65) Prior Publication Data
US 2008/0010511 A1    Jan. 10, 2008

Related U.S. Application Data

(63) Continuation of application No. PCT/JP2005/005033, filed on Mar. 18, 2005.

(51) Int. Cl.
*G06F 11/00* (2006.01)
(52) U.S. Cl. .............................. 714/47; 714/30; 714/31; 713/1; 713/2
(58) Field of Classification Search .................. 714/30, 714/31, 47; 713/1, 2
See application file for complete search history.

(56) References Cited

U.S. PATENT DOCUMENTS

| | | | |
|---|---|---|---|
| 5,583,987 A | 12/1996 | Kobayashi et al. | |
| 5,615,370 A | 3/1997 | Nagai | |
| 5,768,585 A | 6/1998 | Tetrick et al. | |
| 6,122,756 A | 9/2000 | Baxter et al. | |
| 6,216,226 B1 * | 4/2001 | Agha et al. | ..................... 713/2 |
| 6,854,081 B1 | 2/2005 | Suzuki | |
| 7,225,327 B1 * | 5/2007 | Rasmussen et al. | ............ 713/2 |
| 2003/0212884 A1 * | 11/2003 | Lee et al. | ........................ 713/1 |
| 2005/0166074 A1 * | 7/2005 | Hack | ......................... 713/320 |

FOREIGN PATENT DOCUMENTS

| | | |
|---|---|---|
| JP | 60100231 A | 6/1985 |
| JP | 7306793 A | 11/1995 |
| JP | 816534 A | 1/1996 |
| JP | 887341 A | 4/1996 |
| JP | 200040069 A | 2/2000 |
| JP | 2001154999 A | 6/2001 |

OTHER PUBLICATIONS

International Search Report of PCT/JP2005/005033, date of mailing Jun. 21, 2005.
Supplementary European Search Report, issued Jun. 30, 2010 for corresponding European Patent Application No. 05721183.1.

* cited by examiner

*Primary Examiner*—Robert Beausoliel
*Assistant Examiner*—Charles Ehne
(74) *Attorney, Agent, or Firm*—Westerman, Hattori, Daniels & Adrian, LLP

(57) ABSTRACT

It is possible to suppress a CPU showing signs of unstable operation before the OS starts. A micro program acquires error CPU information (which cannot be recognized directly by the micro program) from the service processor immediately before the termination of the micro program and making a request for suppression of the CPU showing signs of unstable operation according to the acquired error CPU information. The service processor suppresses the CPU showing signs of unstable operation before the OS starts.

13 Claims, 4 Drawing Sheets

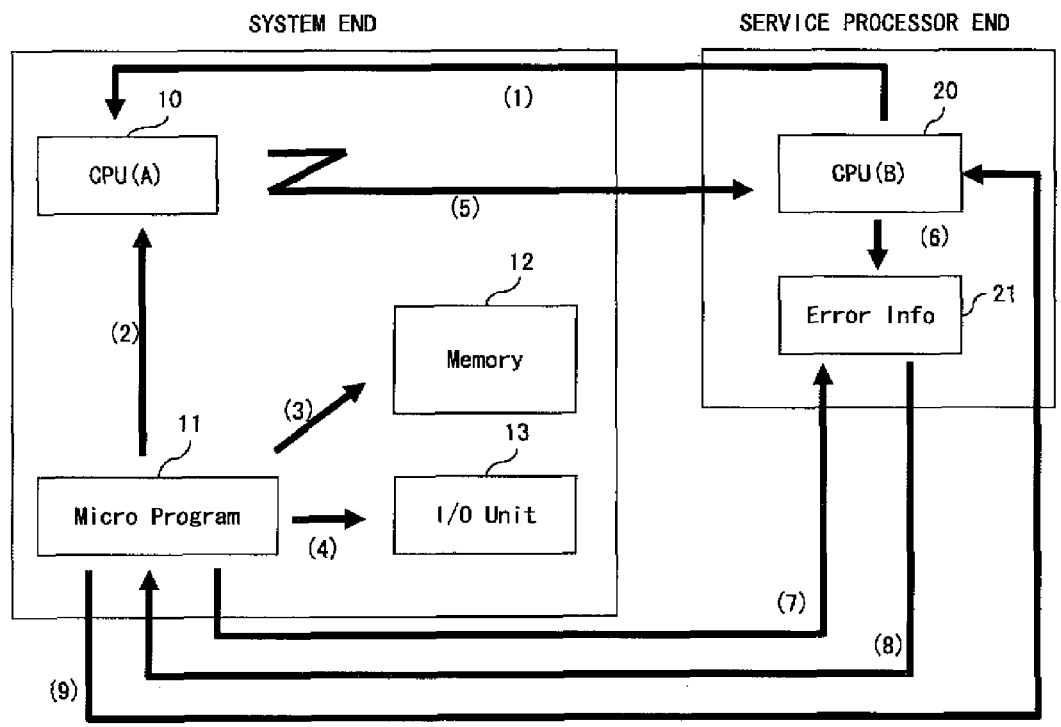
F I G. 3

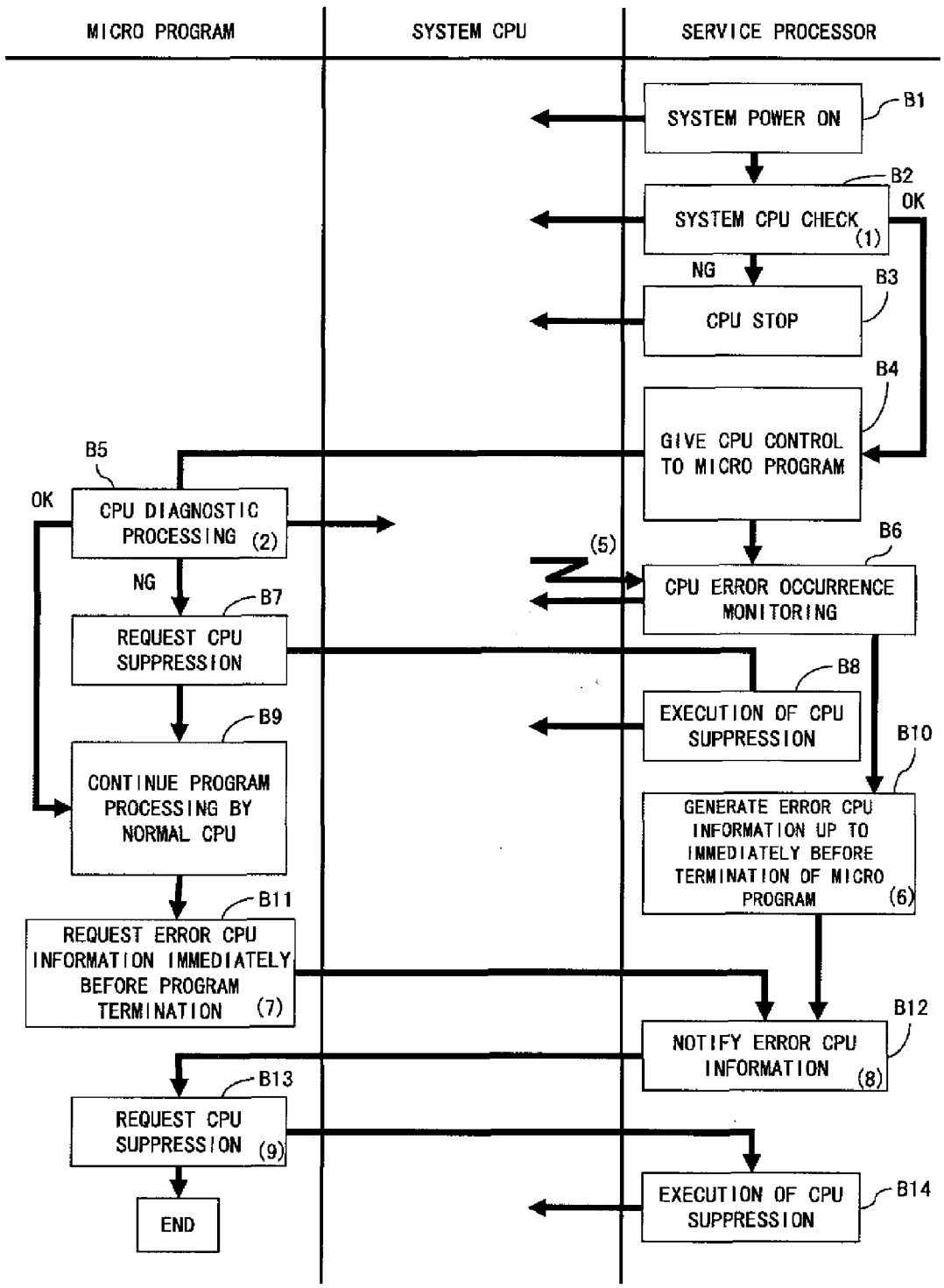
F I G. 4

CPU SUPPRESSION SYSTEM AND CPU SUPPRESSION METHOD USING SERVICE PROCESSOR

CROSS REFERENCE TO RELATED APPLICATIONS

This application is a continuation of the PCT application PCT/JP2005/005033 which was filed on Mar. 18, 2005.

BACKGROUND OF THE INVENTION

1. Field of the Invention

The present invention relates to a CPU suppression system and a CPU suppression method using a service processor, which detects a CPU showing signs of unstable operation before operating system (OS) starts and prevents the CPU from being incorporated into a system.

2. Description of the Related Art

FIG. 1 is a diagram showing an overview of a configuration of a CPU suppression system using a service processor for realizing conventional CPU suppression. A Micro Program 11 of FIG. 1, when being triggered by system resetting such as power activation, rebooting, or resetting of the system, functions as a module for performing diagnostics of units constituting the system. The Micro Program 11 shown in FIG. 1 is executed by a CPU of an operational system end, that is CPU (A) 10 in FIG. 1. It should be noted that although CPU (A) 10 on the operational system end is described as a single CPU in FIG. 1, it will be obvious that the CPU on the operational system end actually comprises a plurality of CPUs.

Because the point in time at which the CPU control of the operational system end is given to the Micro Program 11 shown in FIG. 1 is after a operation check is performed for the CPU by the service processor end shown by arrow (1), the CPU on the operational system end is in a state that can at minimum perform basic operations using its own hardware resources. For a CPU on the operational system end that is determined to be NG (No Good) via a CPU operation check on the operational system end performed by a service processor CPU(B) 20, the service processor CPU (B) 20 executes CPU stop processing so that control is not given to the Micro Program 11.

The Micro Program 11 shown in FIG. 1, as shown by arrows (2), (3), and (4) in FIG. 1, sets initial settings and performs diagnostics of units constituting the system such as the operational system CPU(A) 10, memory 12, and an I/O unit 13, and exchanges information with the service processor end.

FIG. 2 is a diagram showing an overview of a processing sequence that explains the configuration of the CPU suppression system using a conventional service processor along with the Micro Program, the system CPU, and the service processor. The numbers in the sequence chart shown in FIG. 2 correspond to the numbers in the configuration diagram of the CPU suppression system using the conventional service processor shown in FIG. 1, and therefore, in the following description, the configuration of the CPU suppression system using the conventional service processor is explained with reference to FIG. 1 and FIG. 2. As shown in FIG. 2, first, the system CPU is powered on at the service processor end (A1). Next, a operation check of the system CPU(A) 10 ((1) of FIG. 1) is performed (A2). At that time, if the CPU (A) 10 on the operational system end is in such a state that it can perform basic operation using its own hardware resources, CPU control is given to the Micro Program 11 (A4). When the operation check of the CPU on the operational system end determines a diagnosis of NG (No Good), the service processor executes CPU stop processing and, as a result, control is not given to the Micro Program 11 (A3).

The Micro Program 11 that is given the control from the service processor CPU (B) 20 begins setting the initial settings and performing diagnostics of the units constituting the system, and performs CPU diagnostic processing ((2) of FIG. 1) (A5).

During the setting of initial settings and the performance of diagnostics of the unit constituting the system, the service processor CPU (B) 20 constantly monitors error occurrences in the system CPU (A) 10 and informs the CPU on the system end of an error occurrence only immediately before the Micro Program shifts to the next control process (A6). From the time at which the Micro Program 11 performs initial settings/diagnostics of the units constituting the system (arrows (2), (3) and (4) of FIG. 1) to the time after the OS starts, the service processor CPU(B) 20 recognizes (arrow (5) of FIG. 1) the occurrence of a CPU hardware error, and when the number of occurrences of errors exceeds a preset threshold, the CPU is considered to be "a CPU showing signs of unstable operation that may consequently cause critical errors" and is placed in a waiting status by the OS. In other words, in the conventional art, the CPU in question is brought to a state in which processes are not assigned and the CPU is separated in a manner similar to software rather than being physically separated, and the Micro Program 11 executes suppression triggered by the next resetting. When the result of the diagnostics by the Micro Program 11 is a diagnosis of OK, the normal CPUs continue program processing and the diagnostic processing is terminated (A8). On the other hand, if the CPU diagnostic processing by the Micro Program results in an indication of NG of the CPU on the system end itself, the Micro Program 11 itself suppresses the CPU (A7), and even when CPU suppression occurs, if the remaining normal CPUs can continue the program processing, the processing is continued and diagnostic processing by the Micro Program 11 is terminated (A8). In other words, even if the OS does not assign processes to the CPU showing signs of unstable operation, it is the state after the OS has been started and the time at which such a CPU is separated is the time of rebooting etc. that is the next Micro Program starts (see Patent Document 1).

As described above, because the conventional CPU suppression system using a service processor recognizes a CPU showing signs of unstable operation after the OS starts and executes CPU suppression upon the next system reset, there has been a problem such that suppression of a CPU showing signs of unstable operation cannot be executed before the OS starts.

In the manufacturing of computers, variations in CPU quality due to the production process are inevitable. Therefore, identification of CPUs showing signs of unstable operation caused by the quality variation, recognition of the level of the unstable operation, and stable operation of the system by separating the CPU from the constituting units before system operation are crucial issues.

Recognition and suppression of CPUs showing signs of unstable operation before the OS starts and preventing the unstable CPUs from being incorporated into the units constituting the system is of great importance to improving the robustness of the operational system and to reducing the maintenance work time for correcting failures ("failure maintenance time" hereinafter) and the cost of maintenance when a failure occurs after operation has begun. However, when such processes are realized by the hardware functions, system cost increases led by the increase in hardware that needs to be implemented and the increase in the system size are impediments to resolving the issues.

Patent document 1: Laid-Open Japanese Patent Application Publication No. H08-087341

SUMMARY OF THE INVENTION

In order to solve the above issues, it is an object of the present invention to provide a CPU suppression system and a CPU suppression method using a service processor for recognizing a CPU showing signs of unstable operation and determining the CPU to be suppressed by a Micro Program, and for preventing the CPU from being incorporated into the operational system before the OS starts.

A CPU suppression method using a service processor comprises obtaining CPU information (information of an error that cannot be directly recognized by a micro program) obtained from the service processor by the micro program immediately before the termination of the micro program, making a request for suppression of a CPU showing signs of unstable operation to the service processor on the basis of the obtained CPU-in-error information, and executing the suppression of the CPU showing signs of unstable operation by the service processor before the OS starts.

According to the present invention, by executing the suppression of a CPU showing signs of unstable operation before the OS starts, it is possible to improve the robustness of the operational system and to reduce failure maintenance time and maintenance costs when a failure occurs after operation has begun.

BRIEF DESCRIPTION OF THE DRAWINGS

FIG. 3 is a diagram showing an overview of a configuration of the CPU suppression system using a service processor for realizing CPU suppression;

FIG. 4 is a diagram showing an overview of a processing sequence that explains the configuration of the CPU suppression system using a service processor of the present invention between the Micro Program, the system CPU, and the service processor.

DESCRIPTION OF THE PREFERRED EMBODIMENTS

Figure 1:
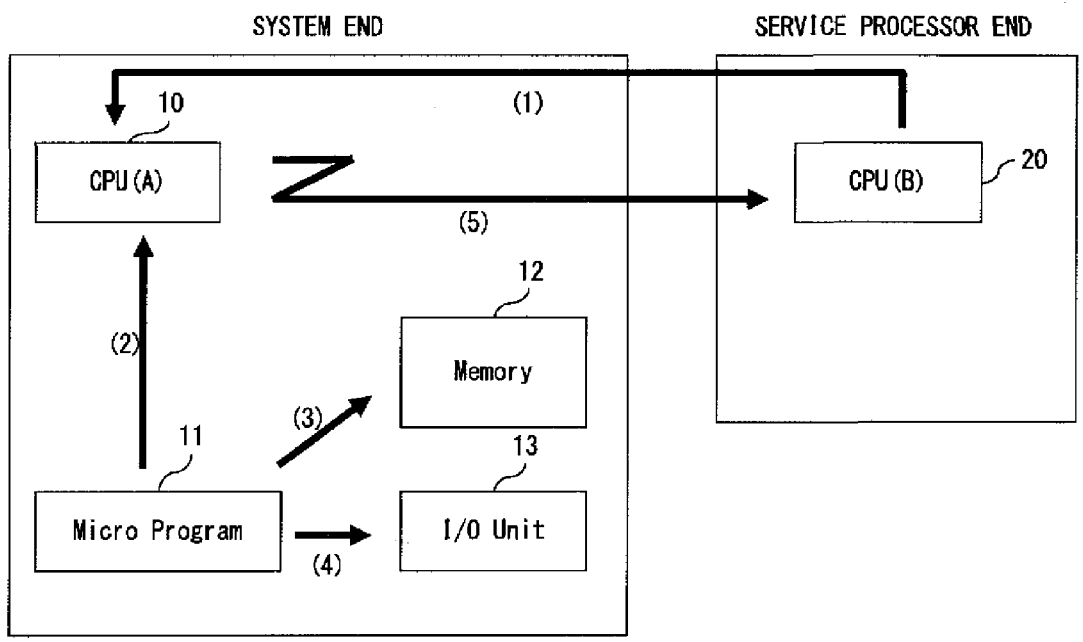
FIG. 1 is a diagram showing an overview of a configuration of a CPU suppression system using a service processor for realizing conventional CPU suppression.
Figure 2:
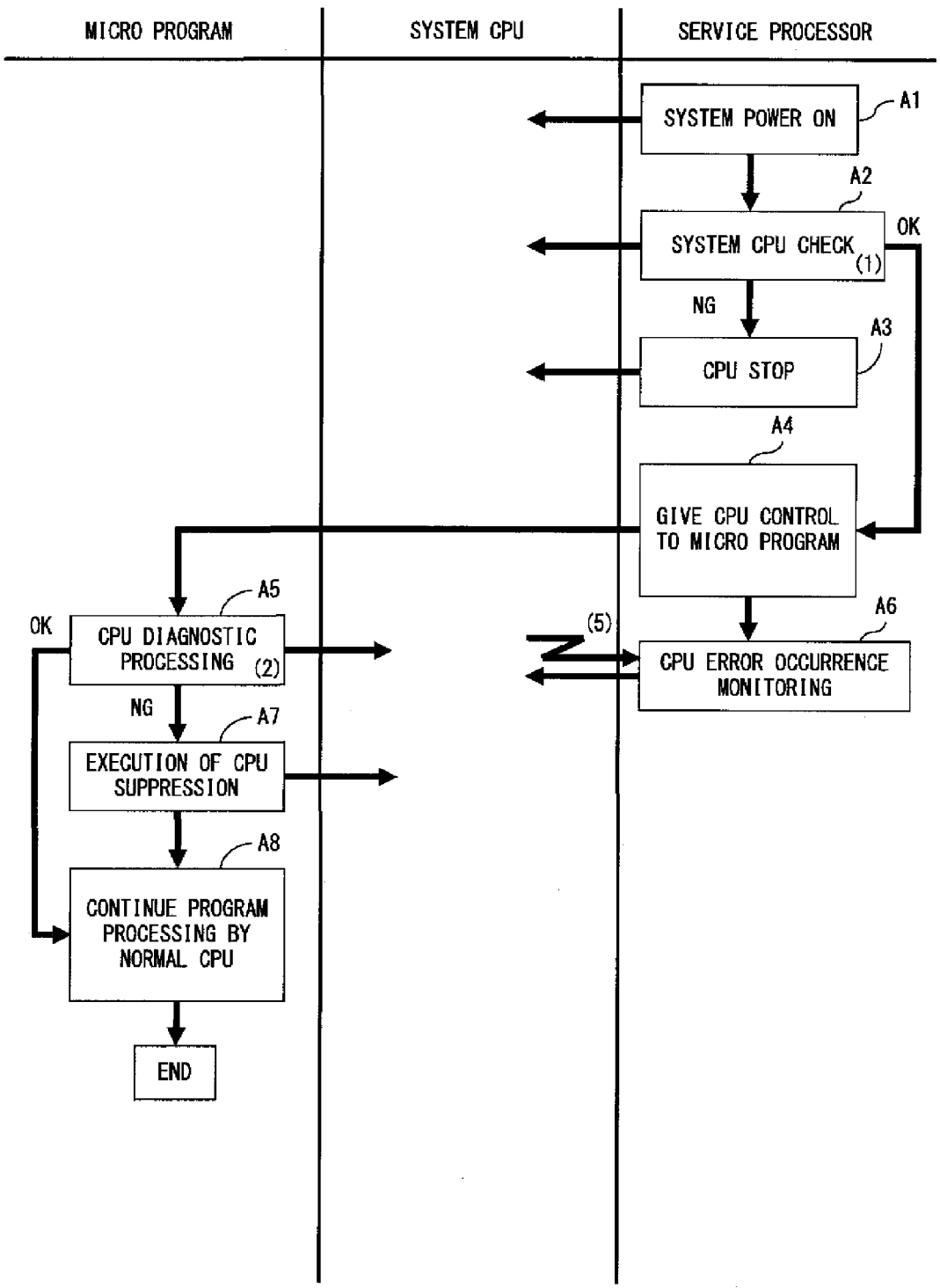
FIG. 2 is a diagram showing an overview of a processing sequence that explains the configuration of the CPU suppression system using a conventional service processor in conjunction with the Micro Program, the system CPU, and the service processor.

The following is a description of the preferred embodiment of the present invention by referring to the accompanying drawings.

FIG. 3 is a diagram showing an overview of a configuration of the CPU suppression system using a service processor for realizing CPU suppression of the present invention. The Micro Program 11 of FIG. 3, when being triggered by a system resetting such as power activation, rebooting or resetting of the system, functions as a module for performing diagnostics of units constituting the system. The Micro Program 11 shown in FIG. 3 is executed by the CPU on the operational system end, that is, CPU(A) 10 in FIG. 3. It should be noted that although CPU(A) 10 on the operational system end is described as a single CPU in FIG. 3, it will be obvious that the CPU on the operational system end actually comprises a plurality of CPUs.

Because the point in time at which the CPU control of the operational system end is given to the Micro Program 11 shown in FIG. 3 is after a operation check of the CPU performed by the service processor end shown by arrow (1), the CPU on the operational system end is at minimum in a state that can perform basic operations using its own hardware resources. For a CPU on the operational system end that is determined to be NG (No Good) by a operation check of the CPU on the operational system end performed by a service processor CPU(B) 20, the service processor CPU(B) 20 executes CPU stop processing so that the control is not given to the Micro Program 11.

The Micro Program 11 shown in FIG. 3 by arrows (2), (3), and (4) sets initial settings and diagnostics of units constituting the system such as the operational system CPU(A) 10, memory 12, and an I/O unit 13, and exchanges information with the service processor end.

FIG. 4 a diagram showing an overview of a processing sequence that explains the configuration of the CPU suppression system using a service processor of the present invention in conjunction with the Micro Program, the system CPU, and the service processor. The numbers in the sequence chart shown in FIG. 4 correspond to the numbers in the configuration diagram of the CPU suppression system using the service processor of the present invention shown in FIG. 3, and therefore, in the following description, the configuration of the CPU suppression system using the service processor of the present invention is explained with reference to FIG. 3 and FIG. 4. As shown in FIG. 4, first, the system CPU is powered on at the service processor end (B1). Next, a operation check of the system CPU (A) 10 ((1) of FIG. 3) is performed (B2). At that time, if a CPU(A) 10 on the operational system end is in a state that can perform basic operations using its own hardware resources, CPU control is given to the Micro Program 11 (B4). When the operation check of the CPU on the operational system end determines a diagnosis of NG (No Good), CPU stop processing is executed and control is not given to the Micro Program 11 (B3).

The Micro Program 11 that is given control from the service processor CPU(B) 20 starts setting the initial settings and performing diagnostics of the units constituting the system, and performs CPU diagnostic processing ((2) of FIG. 3) (B5). During the CPU diagnostic processing, the service processor CPU (B) 20 constantly monitors error occurrences in the system CPU(A) 10 and informs the CPU on the system end of error occurrences only immediately before the Micro Program shifts to the next control process (B6). In other words, the service processor CPU(B) 20 recognizes the occurrence of a CPU hardware error (arrow (5) of FIG. 3) while the Micro Program 11 is setting initial settings/performing diagnostics of the units constituting the system (arrows (2), (3) and (4) of FIG. 3), and when the number of occurrences of errors exceeds a preset threshold, the CPU is considered to be "a CPU showing signs of unstable operation that may consequently cause a critical error" and the service processor CPU (B) 20 is requested to execute CPU suppression (B13). When the result of the diagnostics by the Micro Program 11 is a diagnosis of OK, the normal CPUs continue program processing (B9). On the other hand, if the CPU diagnostic processing by the Micro Program results in a diagnosis of NG of the CPU on the system end itself, the service processor 20 is requested to execute CPU suppression (B7). The service processor CPU(B) 20 executes the CPU suppression requested by the Micro Program 11 (B8), and if the remaining normal CPUs can continue the program processing, the processing is continued (B9).

The service processor CPU (B) 20 recognizes the occurrence of a CPU hardware error (arrow (5) of FIG. 3) while the Micro Program 11 is conducting initial settings/diagnostics of the units constituting the system (arrows (2), (3) and (4) of FIG. 3) (B6), accumulates CPU-in-error information on the system end until immediately before the termination of the Micro Program (the details are explained later) and makes up "Error Info" 21 ([Error Info] in FIG. 3) ((6) in FIG. 3) (B10). Consequently, "Error Info" 21 constitutes an information accumulation unit for a CPU in error.

The Micro Program 11 makes a request to the service processor CPU (B) 20 for notification of a CPU that has generated an error immediately before its termination ((7) of FIG. 3) (B1), and the service processor CPU(B) 20 notifies the Micro Program 11 of the CPU that has generated the error on the basis of "Error Info" 21((8) of FIG. 3) (B12).

The Micro Program 11 evaluates the contents of the notified CPU-in-error information that has generated an error, and determines the CPU for which a suppression request has been made by the service processor CPU(B) 20, and requests the suppression of the CPU to the service processor CPU(B) 20 ((9) of FIG. 3) (B13). In the present invention, because CPU resources must be used for setting initial settings/performing diagnostics of the micro program, suppression of a CPU showing signs of unstable operation is executed immediately before the termination of the Micro Program.

Upon receiving the suppression request from the Micro Program 11, the service processor CPU(B) 20 executes the suppression of the CPU (B14).

It should be noted that when a CPU hardware error does not occur while the Micro Program is running (during initial settings/diagnostics of the units constituting the system), the initial settings/diagnostics processing by the Micro Program is terminated as per normal operations.

As described above, according to the present invention, by obtaining the CPU-in-error information that the Micro Program cannot directly recognize from the service processor end, it is possible to execute suppression of a CPU showing signs of unstable operation before the OS starts, resulting in improvements in the robustness of the operational system and a reduction in failure maintenance work time and maintenance costs when a failure occurs after operation has begun.

To explain the CPU-in-error information on the system end, the CPU-in-error information includes IAEs (Instruction Access Errors) such as memory UEs (Uncorrectable Errors) during instruction fetching etc., DAEs (Data Access Errors) such as UEs during loading/storing access to cache memory etc., and errors with a high error level, besides IAE and DAE, that block instruction execution such as I_UGEs (Instruction Urgent Errors) that are seen in, for example, UEs in registers (PC (Program Counter) registers and CCRs (Condition Codes Registers), which can be seen from the program, these errors are classified into the instruction synchronous errors; the CPU-in-error information also includes REs (Restrainable Errors) or errors with a low error level that have no adverse effects on the program in execution such as CEs (Correctable Errors) that are corrected by hardware, these errors are classified into the instruction asynchronous errors. In the present invention, regardless of the error level, when a CPU is determined to be "a CPU showing signs of unstable operation" by a CPU suppression request to the service processor, it is possible to improve robustness in the operational system and to reduce the work time required for maintenance of a failure and maintenance costs when a failure occurs after operation has begun.

In a computer system that cannot fully implement hardware functions for recognizing/suppressing a CPU showing signs and the level of unstable operation due to cost or other such reasons, it is possible to establish an inexpensive and high-quality computer system having a function for recognizing/suppressing a CPU showing signs and the level of unstable operation by implementing the functions via the Micro Program.

What is claimed is:

1. A CPU suppression system comprising:
   a service processor; and
   an operational system that contains a CPU, the CPU executing a micro program for performing a diagnosis of a unit in the operational system including the CPU, wherein
   the service processor performs a CPU check of an operational system, gives CPU control to the micro program when the service processor determines that the CPU has a capability of performing basic operations using its own hardware resources using the CPU check, monitors error occurrences in the CPU of the operational system while the CPU executes the micro program, and corrects CPU-in-error information when any CPU error is detected, and
   the CPU executes the micro program when the CPU control is given from the service processor, obtains CPU-in-error information from the service processor immediately before completing the diagnosis by the micro program, and makes a request for suppression of a CPU showing signs of unstable operation to the service processor on the basis of the obtained CPU-in-error information.

2. The CPU suppression system using a service processor according to claim 1, wherein
   the service processor comprises a CPU-in-error information accumulation unit to store the corrected CPU-in-error information.

3. The CPU suppression system using a service processor according to claim 2, wherein
   the service processor notifies the micro program of the CPU-in-error information stored in the CPU-in-error information accumulation unit when being requested to send the CPU-in-error information from the micro program.

4. The CPU suppression system using a service processor according to claim 1, wherein the service processor includes a plurality of processors.

5. The CPU suppression system using a service processor according to claim 1, wherein the micro program makes the request for suppression of the CPU prior to loading an operating system.

6. The CPU suppression system using a service processor according to claim 5, wherein the micro program tests for instruction access errors.

7. The CPU suppression system using a service processor according to claim 5, wherein the micro program tests for memory uncorrectable errors.

8. The CPU suppression system using a service processor according to claim 7, wherein the memory uncorrectable errors include program counter errors.

9. The CPU suppression system using a service processor according to claim 7, wherein the memory uncorrectable errors include condition code errors.

10. The CPU suppression system using a service processor according to claim 5, wherein the micro program tests for data access errors.

11. The CPU suppression system using a service processor according to claim 5, wherein the micro program tests for instruction urgent errors.

12. The CPU suppression system using a service processor according to claim 5, wherein the micro program tests for uncorrectable instruction urgent errors.

13. A CPU suppression method comprising:

monitoring, by a service processor, an occurrence of a CPU hardware error in an operational system while a micro program is setting an initial setting or is performing a diagnosis of a unit constituting a system;

generating CPU-in-error information of CPU in which an error occurred when the service processor has detected occurrence of the CPU hardware error;

notifying the CPU-in-error information from the service processor to the micro program upon receiving the request from the micro program;

evaluating, by the micro program, the content of the notified CPU-in-error information to determine which CPU has to be suppressed;

requesting suppression of the determined CPU from the micro program to the service processor; and suppressing the requested CPU upon receiving the suppression request from the micro program.

* * * * *